United States Patent [19]

Hochstatter et al.

[11] 4,256,155
[45] Mar. 17, 1981

[54] WOOD LATHE WITH DUPLICATING MEANS

[75] Inventors: Brian R. Hochstatter, Florissant; George J. Groya, Missouri River Township, St. Louis County, both of Mo.

[73] Assignee: Emerson Electric Co., St. Louis, Mo.

[21] Appl. No.: 41,863

[22] Filed: May 23, 1979

[51] Int. Cl.³ ............................................. B23B 3/28
[52] U.S. Cl. .......................................... 142/7; 142/38; 142/55; 142/56
[58] Field of Search ........................ 142/55, 56, 38, 7

[56] References Cited

U.S. PATENT DOCUMENTS

| | | | |
|---|---|---|---|
| 2,769,466 | 11/1956 | Brauneis | 142/7 |
| 2,880,767 | 4/1959 | Rodgers | 142/55 |
| 3,204,671 | 9/1965 | Schoenrock | 142/7 |
| 3,768,527 | 10/1973 | Messick | 142/38 |

FOREIGN PATENT DOCUMENTS 367300 5/1920 Fed. Rep. of Germany ............. 142/38

Primary Examiner—Leonidas Vlachos
Attorney, Agent, or Firm—Charles E. Markham

[57] ABSTRACT

A home workshop wood lathe mounted on a flat bed includes a pair of elongated members having horizontal surfaces which extend along opposite sides of and slightly above the lathe ways and are spaced to permit a tail stock to slide along the ways. Brackets for mounting a template or turned article to be duplicated are adjustable along the elongated members. A tool holder having a long flat base spanning the spaced horizontal surfaces is freely slidable thereon. An upstanding tool post near one end of the long base, a pair of upstanding follower pins spaced longitudinally on opposite sides of and closely adjacent the tool post, and a pair of handles arranged for selective attachment to the base on one side or the other of the tool post adapt the tool holder to axial or face plate turning operations and a conveniently detachable plate overlying the spaced horizontal surfaces provides a continuous surface when face plate turning.

9 Claims, 15 Drawing Figures

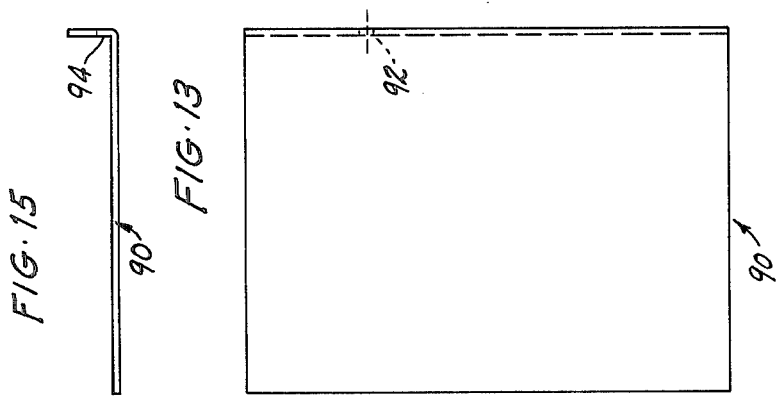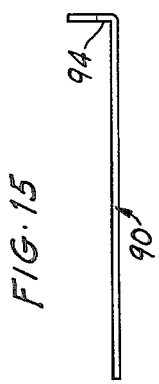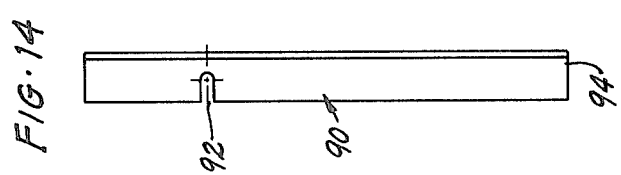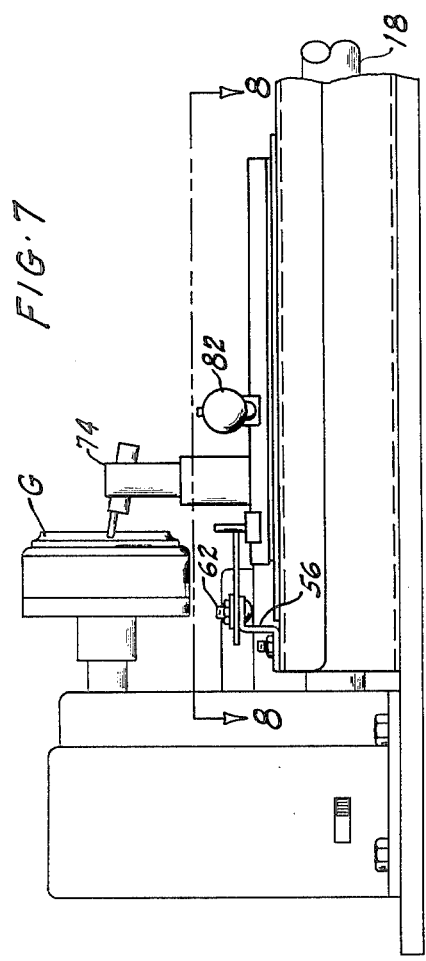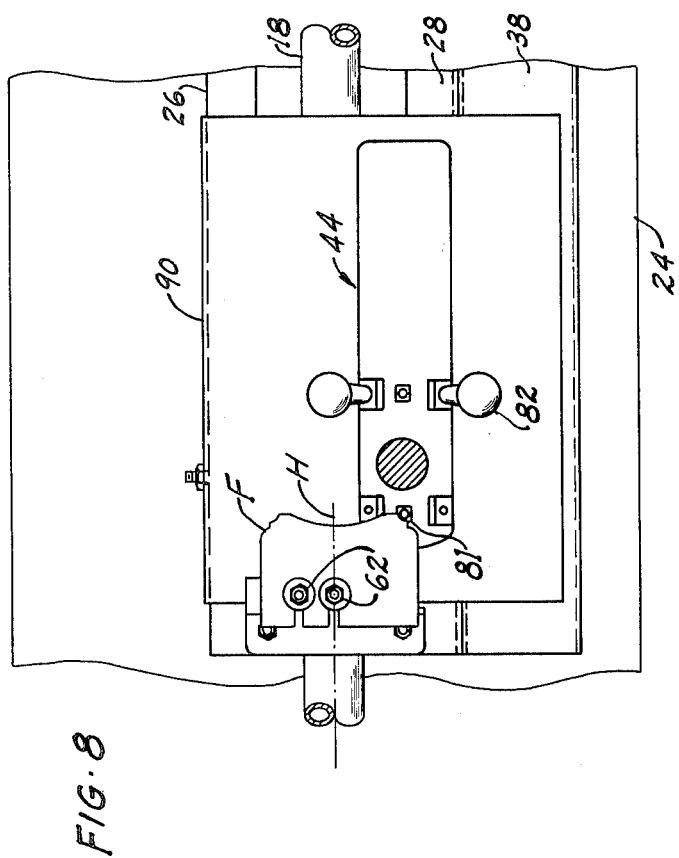

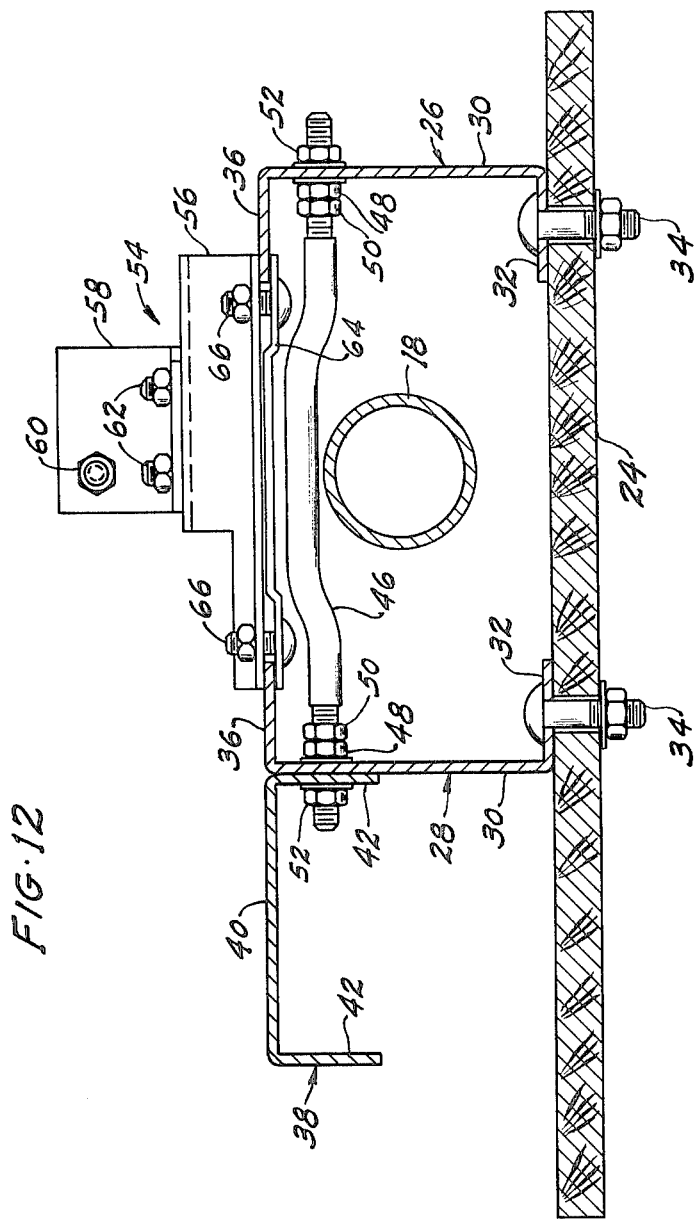

WOOD LATHE WITH DUPLICATING MEANS

This invention relates to relatively inexpensive wood lathes for the home workshop which include means for duplicating existing turned articles and producing turned articles in accordance with flat templates.

THE PRIOR ART

There are numerous prior art patents disclosing wood lathes or attachments therefor by which duplicates of existing turned articles or turned articles in accordance with flat templates can be made. In these prior devices, as exemplified in the disclosures of U.S. Pat. Nos. 2,769,466 to Brauneis, 2,880,767 to Rodgers, and 3,204,671 to Schoenrock, the cutting tool is constrained by guide means to move linearly in two finite relatively perpendicular paths and in some instances rotationally about a fixed axis to facilitate undercutting.

There is, however, a need for a wood lathe of simplified and inexpensive construction for the home workshop with which an operator of average skill may duplicate with acceptable fidelity an existing turned article or produce turned articles in accordance with the contour of a flat template. The U.S. Pat. No. 3,768,527 to Messick discloses a simplified and less expensive means adaptable for attachment to a conventional lathe in which the lathe ways have a flat upper surface on which an extensive platform 40 is mounted. In the Messick arrangement, a tool holder having a flat base 90 of extensive area and a follower thereon is freely slidable in any direction on a flat horizontal surface of platform 40 to follow the contours of an existing turned article or flat template.

The platform 40 in Messick on which the tool holder 90 slides is, however, adapted for mounting on lathe ways having a flat surface and would not be adaptable for mounting on a currently popular home workshop lathe having a single tubular way. Also, it is necessary to remove the platform 40 to permit sliding adjustment of the tail stock 20 on the ways 14 or the sliding adjustment of a conventional tool holder or tool rest mounted thereon when operating the lathe conventionally. Further, there is no provision in Messick for mounting a template to be followed when face plate turning.

Moreover, it is well understood in the art of turning that to prevent or minimize chattering or vibration of the cutting tool and the resulting rough turned surface, the overhang or horizontal extension of the tool from its vertical support must be held to a minimum. In Messick, the follower 96 and the edge of the cutting tool 110 are positioned at the forward or leading edge of the tool holder base 92, while the vertical tool post 100 and the operating handles are positioned at the trailing edge of the base. This results in a maximum overhang of the cutting tool and a maximum distance between the operating handles and the followers and cutting tool edge.

OBJECTS OF THE INVENTION

An object of this invention is to provide a generally new and improved wood lathe with duplicating means in which a manually movable tool holder with a follower thereon is freely slidable on a flat horizontal surface to follow the contours of an existing turned article or flat template.

A further object is to provide duplicating equipment for home workshop wood lathes which when mounted thereon permits slidable adjustment of the tail stock on the lathe ways.

A further object is to provide a wood lathe including duplicating means, in which a tool holder having a flat base freely slidable on a flat horizontal surface has an upstanding tool post and an upstanding follower closely adjacent the tool post and bracket means for mounting the axis of an existing turned article to be duplicated in vertical alignment with the axis of a work piece to be turned, whereby overhang of a cutting tool from the tool post is reduced to a minimum.

A further object is to provide duplicating means for a wood lathe in which a tool holder having a long flat base freely slidable on a horizontal surface has an upstanding tool post, a pair of upstanding follower pins, and a pair of selectively positionable handles all in relatively close proximity at one end of the long base, which may be rotated end for end when changing from axial turning to face plate turning operation.

Further objects and advantages will appear from the following description when read in connection with the accompanying drawings.

IN THE DRAWING

FIGS. 7 and 8 are partial side elevational and top plan views, respectively, showing a flat template mounted near the lathe head stock and a partially turned work piece chucked in the lathe head stock;

FIG. 12 is a transverse cross-sectional view taken along lines 12—12 of FIG. 2; and FIGS. 13, 14, and 15 are top plan, side, and end elevational views, respectively, of the auxiliary plate employed when face plate turning.

DESCRIPTION

Figure 1:
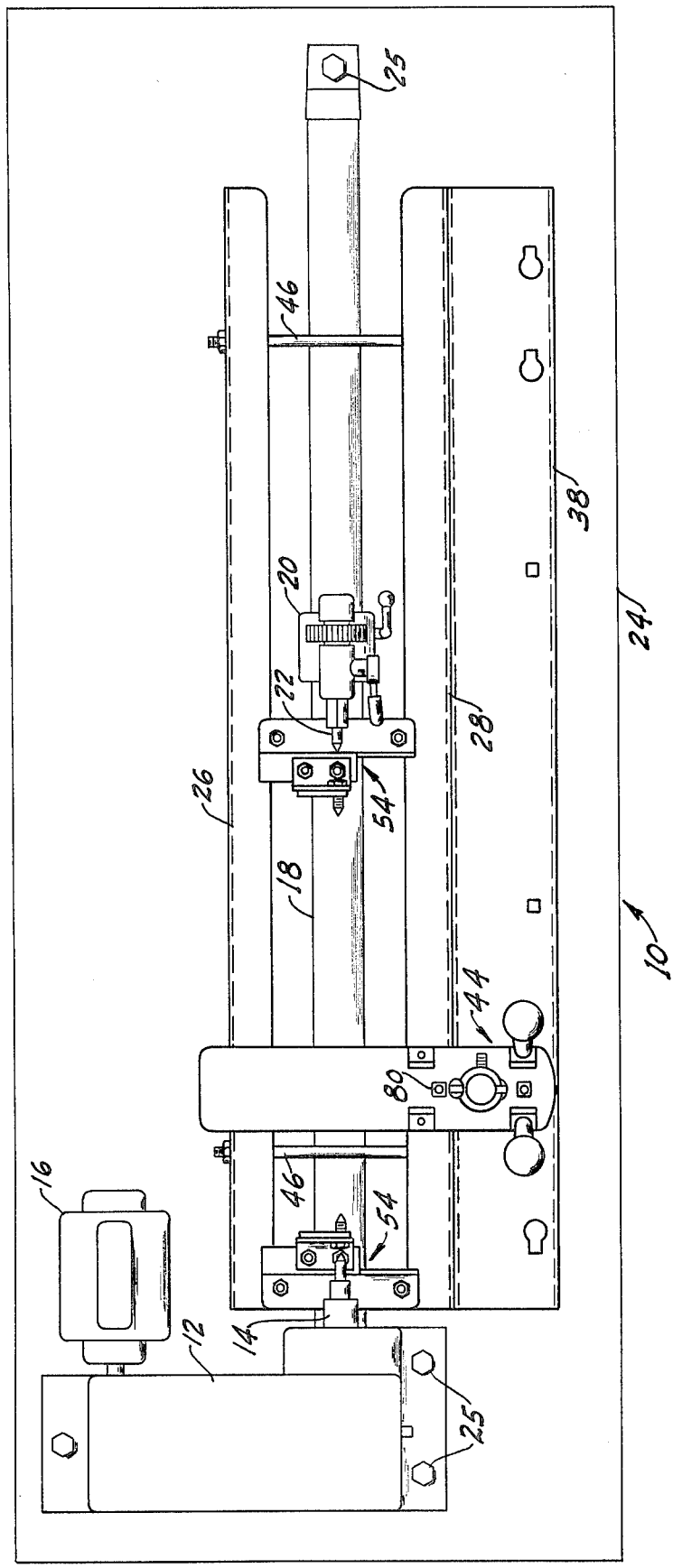
FIG. 1 is a top plan view of a wood lathe with duplicating means, constructed in accordance with the present invention.
Figure 2:
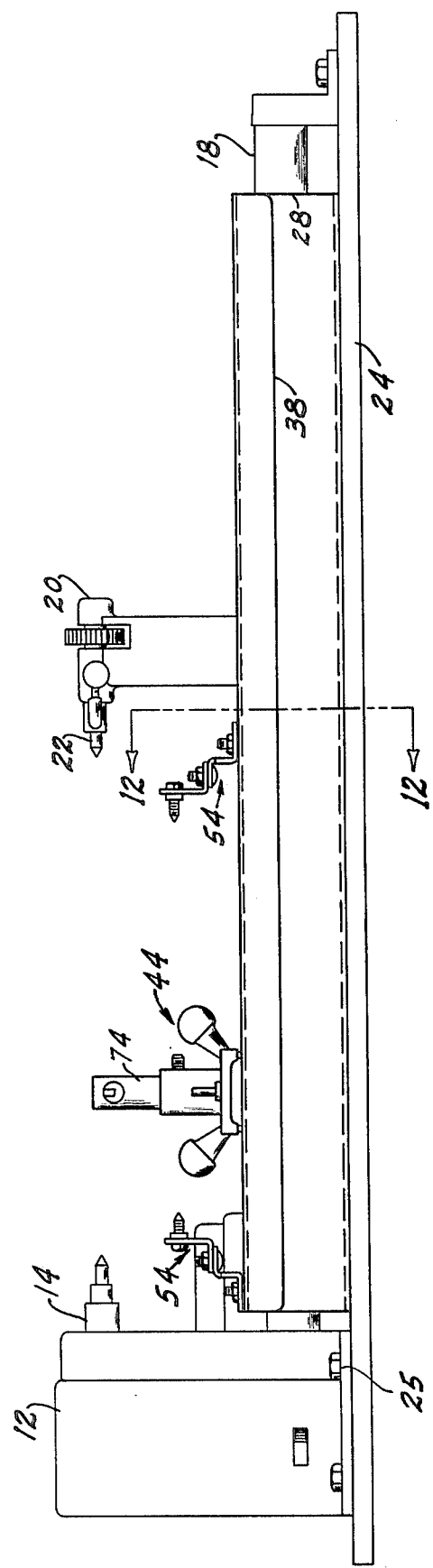
FIG. 2 is a side elevational view of the wood lathe shown in FIG. 1.

Referring to FIGS. 1 and 2 of the drawings in more detail, a home workshop-type wood lathe, generally indicated at 10, has a head stock 12 including a spindle 14 driven by a motor 16. A single tube 18 forms the ways on which a tail stock 20 having a centering pin 22 in axial alignment with spindle 14 is slidably adjustable. The motor, head stock, and rear end of tube 18 are secured to a flat bed 24 by bolts or screws 25, the head end of tube 18 being fixed to the head stock.

Coextending longitudinally along opposite sides of tubular ways 18 are channel members 26 and 28, each of which has a vertical web portion 30, a lower horizontal flange portion 32, and an upper horizontal flange portion 36. The lower horizontal flange portions 32 are secured to the bed 24 by longitudinally spaced screws 34. Coextending with channel member 28 is a third channel member 38 having a horizontal web portion 40 and downwardly extending vertical flange portions 42, one of which flange portions is welded to the vertical web 30 of channel member 28, see FIG. 12.

The upper horizontal flange portions 36 of channel members 26 and 28 extend toward each other, and their adjacent edges are spaced sufficiently to permit the passage therebetween of the slidably adjustable tail stock 20, or other equipment, slidably mounted on tube 18 employed in conventional turning operations. The upper horizontal flanges 36 of channel members 26 and 28 and the horizontal web portion 40 of channel 38 are spaced vertically slightly above the tubular ways 18 and are aligned to form a pair of relatively wide, laterally spaced, horizontal surfaces extending longitudinally substantially the length of the tubular way. A tool holder 44, to be described later, spans these horizontal surfaces and is freely slidable thereon. In order to add rigidity to the members 26, 28, and 38, a pair of formed rods 46 are provided, having screw-threaded ends extending through apertures in the upper portions of webs 30 of channel members 26 and 28 near the ends of these channels. Nuts 48 and jamb nuts 50 on the rods 46 space the vertical web portions of the channel members, and nuts 52 hold them rigidly in spaced relationship.

It is to be understood that while a currently popular home workshop wood lathe, having a single tubular member forming the ways, is illustrated in a preferred embodiment of the invention, a lathe having two parallel members or a single member of any cross-sectional configuration forming the ways may be substituted. However, in any arrangement, the lateral spacing of the horizontal surfaces will be sufficient to permit passage therebetween of a tail stock, tool holder, or tool rest slidably mounted on the ways.

Figure 3:
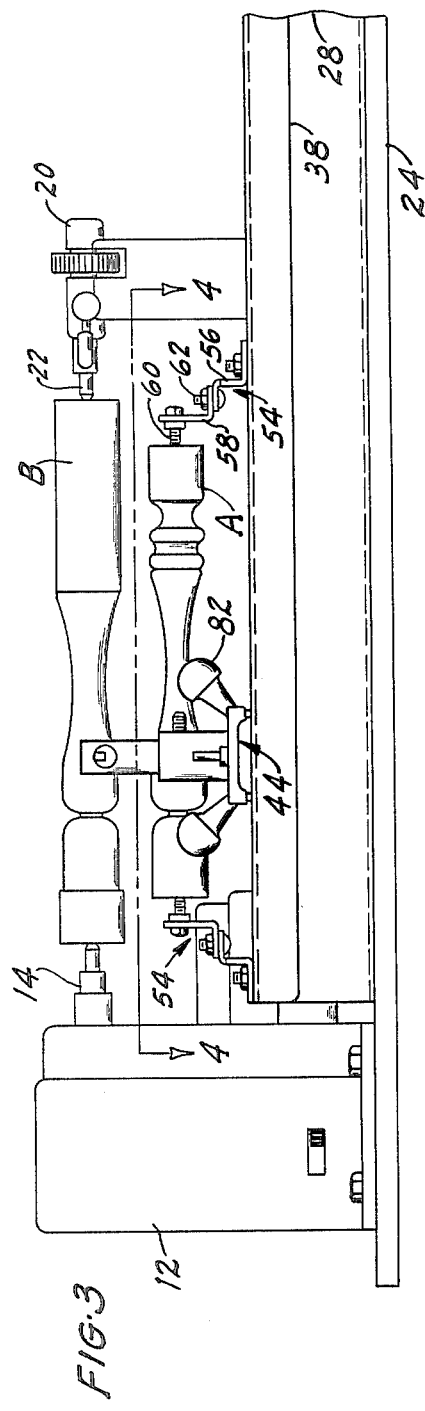
FIGS. 3 and 4 are partial side elevational and top plan views, respectively, showing an elongated turned article to be duplicated mounted below and in vertical axial alignment with a partially turned work piece mounted between the lathe spindle and tail stock center.
Figure 4:
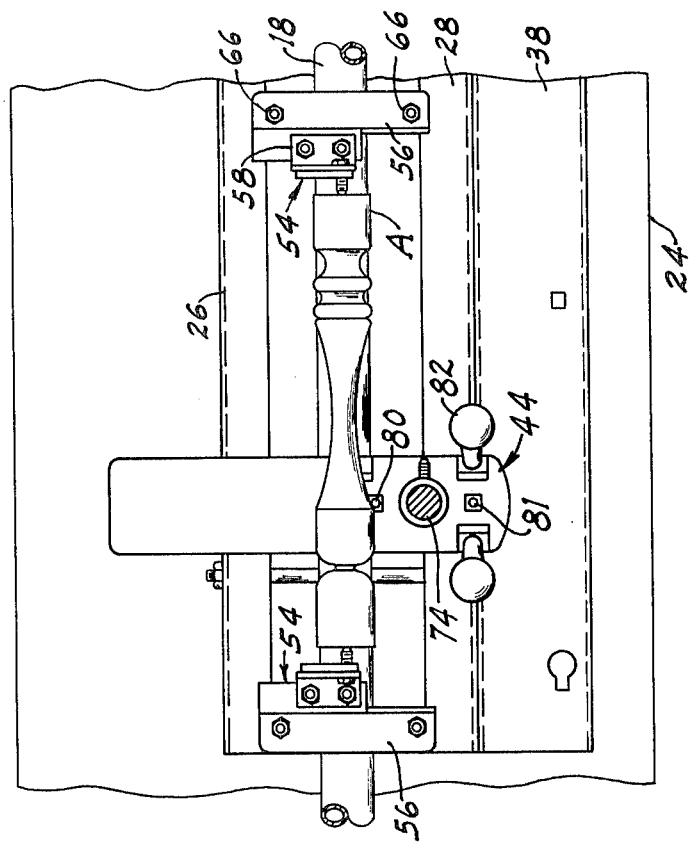

Referring to FIGS. 3 and 4, means for mounting an existing elongated turned article A, to be duplicated, with its axis in vertical alignment with the axis of a work piece B, above, mounted for rotation on an axis through the lathe spindle and tail stock center, comprise a pair of two-piece brackets generally indicated at 54, which brackets are slidably adjustable along channel members 26 and 28. The two-piece brackets 54 each include an elongated lower member 56 of generally Z form in cross-section, spanning the space between the flanges 36 of channel members 26 and 28 and having end portions of its lower horizontal portion overlying and releasably clamped to the edges of flanges 36. The two-piece brackets 54 also each include an upper elongated member 58 of generally L form in cross-section having its horizontal portion detachably connected to the upper horizontal portion of lower Z form member 56 by two bolts 62 passing through two spaced clearance holes in members 56 and 58. A horizontal centering pin 60 is mounted in the vertical portion of each of the upper bracket members 58 and these centering pins are in vertical alignment with the axis of the lathe spindle and tail stock center.

Means for releasably clamping the brackets 54 so that they may be conveniently adjustably positioned along channel members 26 and 28 comprise a flat transversely extending bar 64, see FIG. 12, having its end portions underlying the flanges 36 and attached to the end portions of the overlying Z-form bracket member 56 by bolts 66, which, when tightened, clamp the brackets 54 to flanges 36. Clearance holes in bar 64 and lower bracket member 56 for the bolts 66 are positioned closely adjacent the edges of flanges 36, so that the bolts 66 maintain the lateral position of brackets 54.

Figure 5:
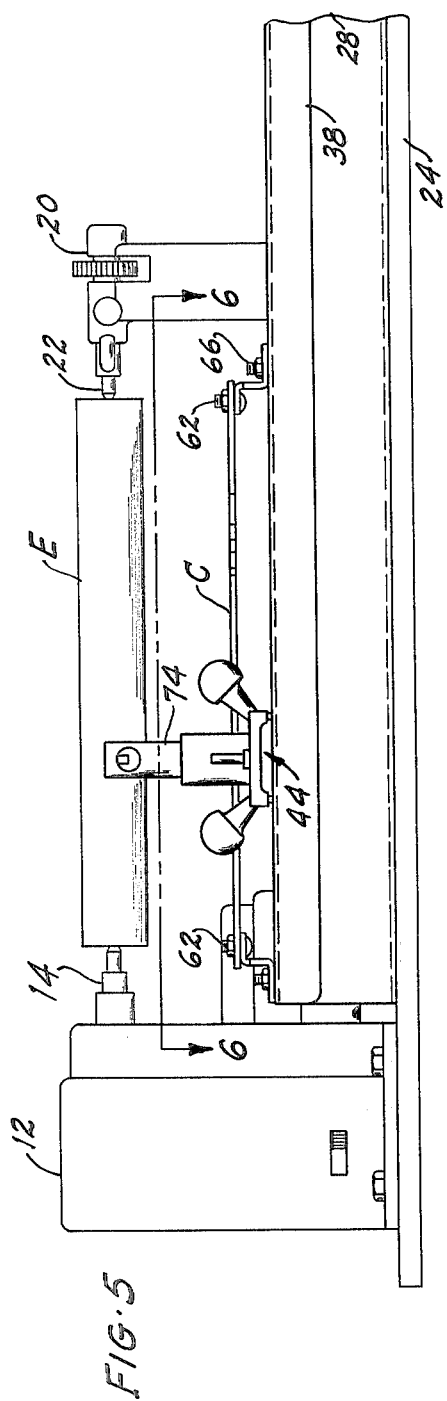
FIGS. 5 and 6 are partial side elevational and top plan views, respectively, showing a flat elongated template mounted below and with its reference center line in vertical alignment with a work piece mounted between the lathe spindle and tail stock center.
Figure 6:
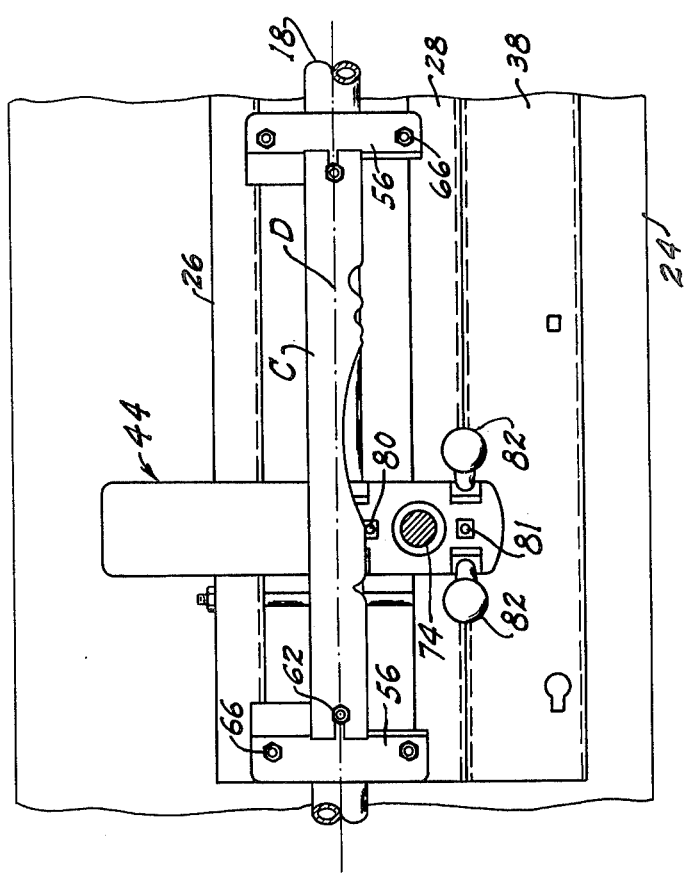

Referring to FIGS. 5 and 6 in which a flat template is employed in lieu of an existing turned article, the upper members 58 of two-piece brackets 54 are removed from lower members 56 and a flat template C is secured to the upper horizontal portions of lower Z-form bracket members 56 by the bolts 62 passing through clearance holes in bracket members 56 and the template. Preferably, one of the two clearances holes in the upper horizontal portion of each of lower bracket members 56 for the passage of bolts 62 is in vertical alignment with the axis of the lathe spindle and tail stock so that a reference center line D on template C may readily be vertically aligned with the axis of a work piece E, above, rotating on the axis of the spindle and tail stock.

Referring to FIGS. 7 and 8, a flat template F, to be followed when face plate turning of a work piece G chucked on the lathe spindle, may also be mounted on the upper horizontal portion of one of the lower bracket members 56 by the two bolts 62 so that a reference center line H of the template may readily be vertically aligned with the turning axis of a work piece G, above.

Figure 11:
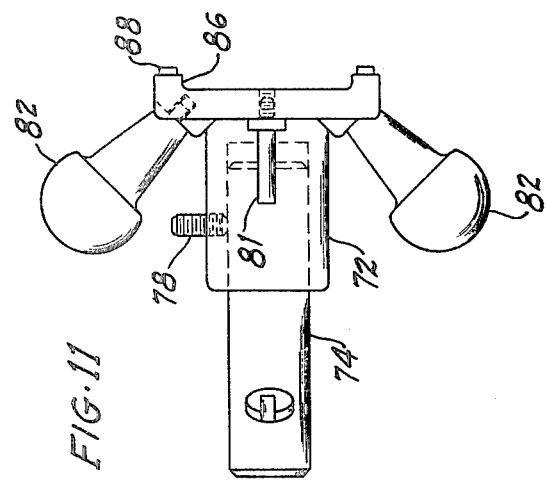
FIG. 11 is an end elevational view of the tool holder.
Figure 9:
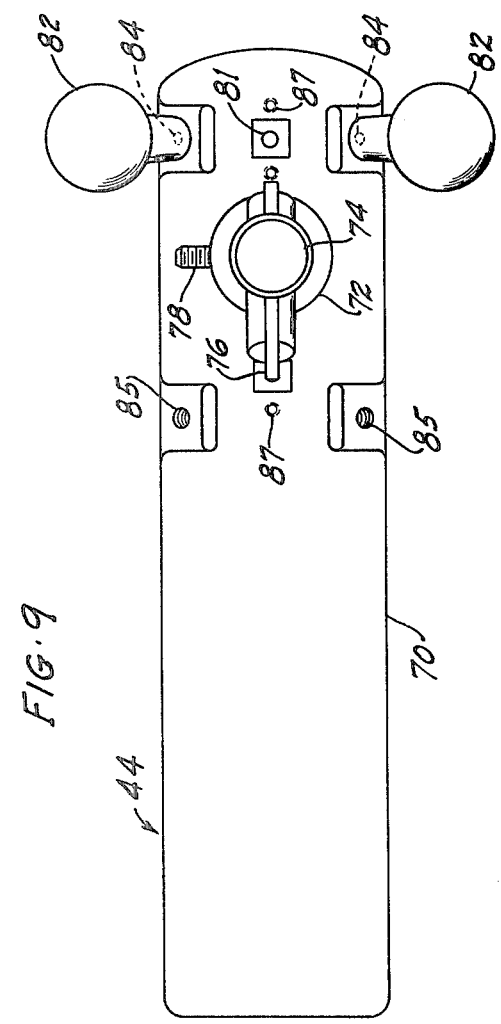
FIG. 9 is a top plan view of the freely slidable tool holder.
Figure 10:
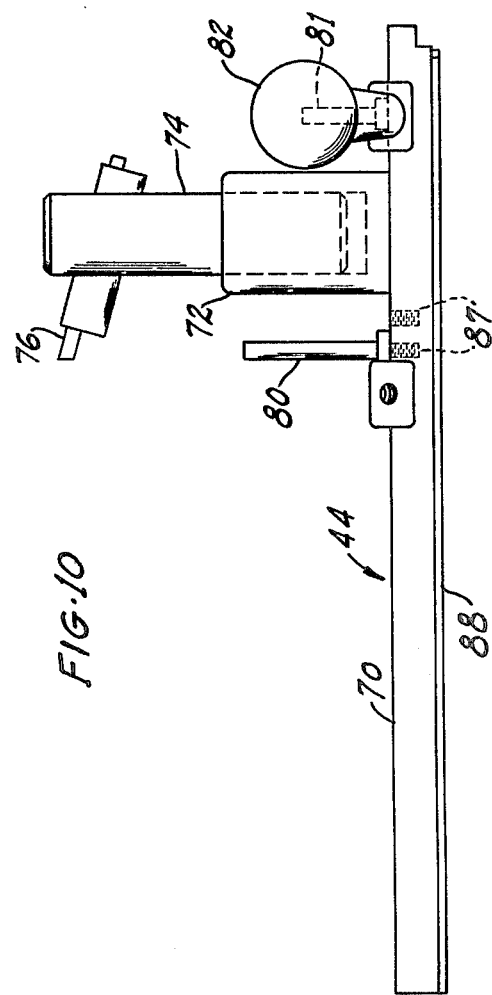
FIG. 10 is a side elevational view of the tool holder.

The tool holder generally indicated at 44, see FIGS. 9, 10, and 11, has an elongated, rectangular, and relatively flat base 70 with an integrally formed, hollow, cylindrical portion 72 extending vertically upward from its upper surface near one end thereof and centered on the longitudinal center line thereof. A round upstanding tool post 74 having a cutting tool 76 projecting laterally from its upper end is slidably adjustable in hollow cylindrical portion 72 and fixed in a vertically adjusted position therein by a set screw 78. The tool holder 44 is further provided with a pair of follower pins 80 and 81 attached to and extending vertically upward from the upper surface of base 70 and positioned on the longitudinal center line thereof and on opposite sides of and closely adjacent cylindrical portion 72.

A pair of handles 82 having screw-threaded end portions are arranged for interchangeable, screw-threaded connection in one or the other of two pairs of laterally spaced screw-threaded holes 84 and 85, which pairs of holes are spaced longitudinally on opposite sides of and adjacent to the cylindrical portion 72. A longitudinally extending central portion of the lower surface of base 70 is recessed so as to provide a pair of narrow runners 86 extending along its longitudinal sides, which runners are capped with flat strips 88 of material, such as Teflon, having a low coefficient of friction. The tool holder base 70 is of considerably greater length than the space between the flanges 36 of members 26 and 28, so that the end thereof remote from the tool post, followers, and handles will remain on the surface 36 of member 26 when the engaged follower 80 is spaced considerably from the turning axis when turning relatively large diameters or when rotating the base about the follower pin when undercutting.

Referring to FIG. 10, it will be noted that the follower pins 80 and 81 are positioned closely adjacent the vertical tool post 74 so as to minimize the horizontal extension therefrom of the cutting tool 76. Obviously, some minimum horizontal extension or overhang of the cutting tool, which provides sufficient clearance of the tool post when making shallow cuts, would not provide sufficient clearance when making relatively deep, narrow cuts. Accordingly, follower pins 80 and 81 are therefore provided with screw-threaded lower ends and may be selectively entered in screw-threaded holes 87, spaced longitudinally along the longitudinal center line of the base on opposite sides of the tool holder, so that the cutting tool overhang need not be greater than the instant turning operation requires. Positioning the operating handles 82 adjacent the cutting tool and follower pins enables the operator to accurately follow the contour of an article to be duplicated with greater ease and control than when the operating handles are remote from these elements.

OPERATION

When turning an elongated work piece B or E rotating on the longitudinal turning axis of the lathe spindle and tail stock center in accordance with the contours of an existing turned article A or a template C, as shown in FIGS. 3 to 6, the tool holder 44 is positioned with the follower pin 80 against the contours of article A. Also, in this position, the handles 82 are mounted in the threaded holes 84 and that end portion of the tool holder base 70 remote from the tool post extends over the horizontal surface of member 26 sufficiently to remain thereon when the tool holder is angled considerably in an undercutting operation.

When "face plate" turning a work piece G chucked on a face plate mounted on the lathe spindle in accordance with the contour of a template F mounted adjacent the head stock, as shown in FIGS. 7 and 8, an auxiliary plate 90, shown in FIGS. 13 to 15, is first positioned to overlie the spaced horizontal surfaces of members 26, 28, and 38. The plate 90 has a slot 92 in a turned down edge 94 thereof which is slipped over a projecting end of a stabilizer rod 46 between the nut 52 and web of member 26 when nut 52 is loosened and is held in position when nut 52 is again tightened. Next, the handles 82 of the tool holder are mounted in screw-threaded holes 85 and the tool holder 44 is placed on plate 90 with the follower pin 81 against the contour of template 81. The elongated tool holder base is therefore adaptable to be turned end for end when switching from a turning operation along the longitudinal axis of the lathe to face plate turning.

From the foregoing, it will be seen that we have provided a wood lathe with duplicating equipment associated therewith, which equipment is conveniently attachable to any lathe of this type mounted on a base suitable for the attachment thereto of channel members 26 and 28. Also, when attached to a lathe in the manner described, the duplicating equipment permits the slidable adjustment of a tail stock on the ways or other equipment slidably adjustable thereon employed in conventional turning operations.

We claim:

1. Duplicating equipment for a wood lathe having a head stock and ways mounted on a flat bed and a tail stock slidably adjustable along the ways, including; a pair of elongated members for mounting on said bed along opposite sides of said ways, said members each having a horizontal surface portion extending along a side of and above said ways and said horizontal surface portions being spaced transversely sufficiently to permit passage therebetween of said tail stock, a tool holder comprising an elongated flat base arranged to span said spaced horizontal surface portions and to be freely slidable thereon, an upstanding tool post with a cutting tool mounted therein and positioned near one end of said elongated base and an upstanding follower pin positioned near said tool post and on the side thereof remote from said one end of said base.

2. The equipment claimed in claim 1 which includes a pair of upstanding handles positioned on said elongated base near said tool post and between said tool post and said one end of said elongated base.

3. The equipment claimed in claim 1 in which said tool post is positioned on the longitudinal center line of said elongated base near one end thereof and in which two upstanding follower pins are positioned on the longitudinal center line of said base, on one each side of and near said tool post.

4. The equipment claimed in claim 1 which includes a pair of upstanding handles arranged for detachable connection to said elongated tool holder base in either of two longitudinally spaced positions closely adjacent to and on opposite sides of said tool post.

5. The equipment claimed in claim 1 which further includes a pair of bracket members slidably adjustable along said elongated members and each extending between said transversely spaced horizontal surface portions thereof and having their ends releasably clamped thereto, and each of said brackets carrying a horizontal centering pin in vertical axial alignment with the longitudinal turning axis of the lathe for mounting an elongated turned article to be duplicated therebetween.

6. A tool holder for a wood lathe arranged to slide freely in any direction on a flat horizontal surface positioned below the turning axis of the lathe comprising; an elongated flat base, an upstanding tool post with a cutting tool mounted therein attached to and positioned near one end of said elongated base, a pair of upstanding follower pins attached to said base and spaced longitudinally on opposite sides of and adjacent said tool post, and a pair of laterally spaced upstanding handles detachably connected to said base adjacent said tool post, and means on said handles and said base for detachably connecting said handles to said base in lateral spaced relationship and longitudinally on either side of and adjacent said tool post.

7. A duplicating wood lathe having a head stock including a spindle and means forming ways attached to a flat bed and a tail stock adjustable along said ways including a centering pin in axial alignment with said spindle, a pair of elongated members mounted on said bed and coextending along opposite sides of said ways, said members each having a horizonal surface portion extending along a side of and above said ways and being laterally spaced sufficiently to permit said tail stock to pass therebetween, a pair of brackets extending between and slidably adjustable along said horizontal surface portions for mounting an article to be duplicated below and in axial alignment with said lathe spindle and tail stock center, a tool holder comprising an elongated flat base spanning said laterally spaced horizontal surface portions and being freely slidable thereon, an upstanding tool post with a cutting tool mounted therein attached to said base near one end thereof, an upstanding follower pin attached to said base closely adjacent said tool post and on the side thereof opposite said one end of said base, and a pair of upstanding laterally spaced handles attached to said base between said tool post and said one end of said base.

8. The duplicating wood lathe claimed in claim 7 in which an auxilliary flat plate is provided to form a laterally continuous horizontal flat surface adjacent said head stock for slidably supporting said tool holder base when performing a face plate turning operation, said plate being arranged to overlie said laterally spaced horizontal surface portions of said elongated members and being detachably connected to one of said members, in which a second upstanding follower pin attached to said base between said tool post and said one end of said base is provided, and in which means for selectively detachably connecting said handles to said base closely adjacent to and on either side of said tool post is provided.

9. The duplicating lathe claimed in claim 7 in which said elongated members coextending along opposite sides of said lathe ways are channel form in cross section having vertical web portions, lower horizontal flange portions attached to said bed, and upper horizontal flange portions extending from said web portions toward each other to form said laterally spaced horizontal surfaces, and in which said brackets extend between and overlie said laterally spaced upper horizontal flange portions and are releasably clamped thereto.

* * * * *